United States Patent [19]

Stapleton

[11] Patent Number: 5,016,799
[45] Date of Patent: May 21, 1991

[54] SUPPORT STANCHION FOR LUGGAGE CARRIER

[75] Inventor: Craig A. Stapleton, Port Huron, Mich.

[73] Assignee: Huron/St. Clair Incorporated, Port Huron, Mich.

[21] Appl. No.: 581,250

[22] Filed: Sep. 10, 1990

Related U.S. Application Data

[63] Continuation of Ser. No. 362,643, Jun. 7, 1988, abandoned.

[51] Int. Cl.⁵ .............................................. B60R 9/00
[52] U.S. Cl. ..................................... 224/326; 224/309
[58] Field of Search ............... 224/326, 325, 327, 309, 224/322, 328

[56] References Cited

U.S. PATENT DOCUMENTS

| | | | |
|---|---|---|---|
| 4,269,339 | 5/1981 | Bott | 224/325 |
| 4,279,368 | 7/1986 | Kowalski | 224/326 |
| 4,341,332 | 7/1982 | Kowalski et al. | 224/326 |
| 4,426,028 | 1/1984 | Bott | 224/325 |
| 4,534,496 | 8/1985 | Bott | 224/326 |

Primary Examiner—Linda J. Sholl
Attorney, Agent, or Firm—Edgar A. Zarins; Malcolm L. Sutherland

[57] ABSTRACT

A support stanchion for a vehicle luggage carrier which provides a sleek aerodynamic appearance while eliminating exposed support mounting fasteners. The stanchions are utilized to support the frame of the carrier in spaced apart relation to the vehicle surface and are secured to the surface by one or more fasteners. Each stanchion includes a support base mounted directly to the surface and a support cover which fits over the base to conceal the fasteners and the interior of the stanchion. The base includes a plurality of apertures adapted to receive tabs formed in the cover and an elongated groove to receive a lip on the cover. The rigid construction of the base and the pliable construction of the cover allows it to simply snap over the base. Once the cover is attached, the stanchion has a sleek integral appearance.

17 Claims, 2 Drawing Sheets

U.S. Patent    May 21, 1991    Sheet 1 of 2    5,016,799
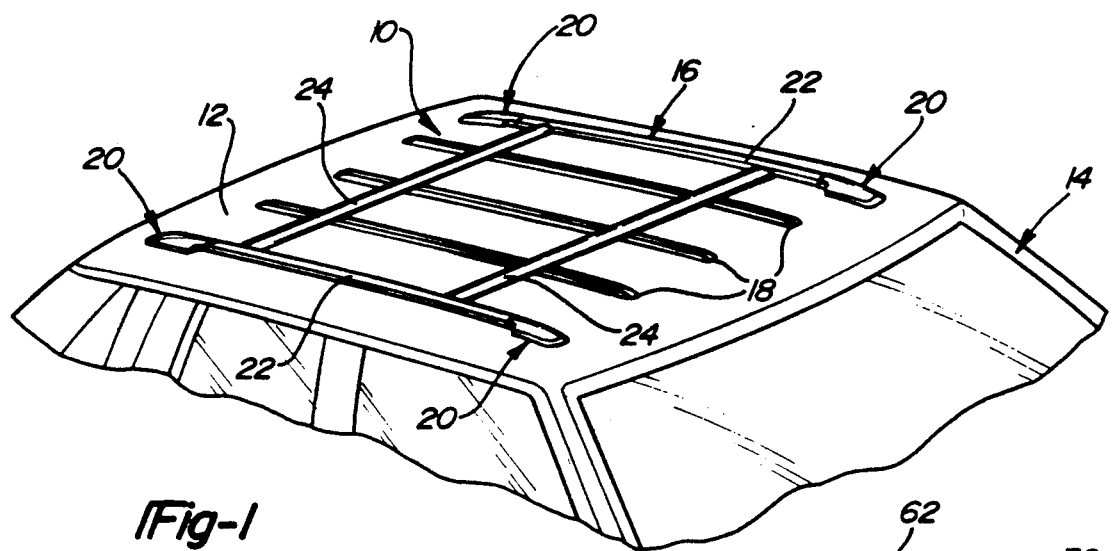
_Fig-1_
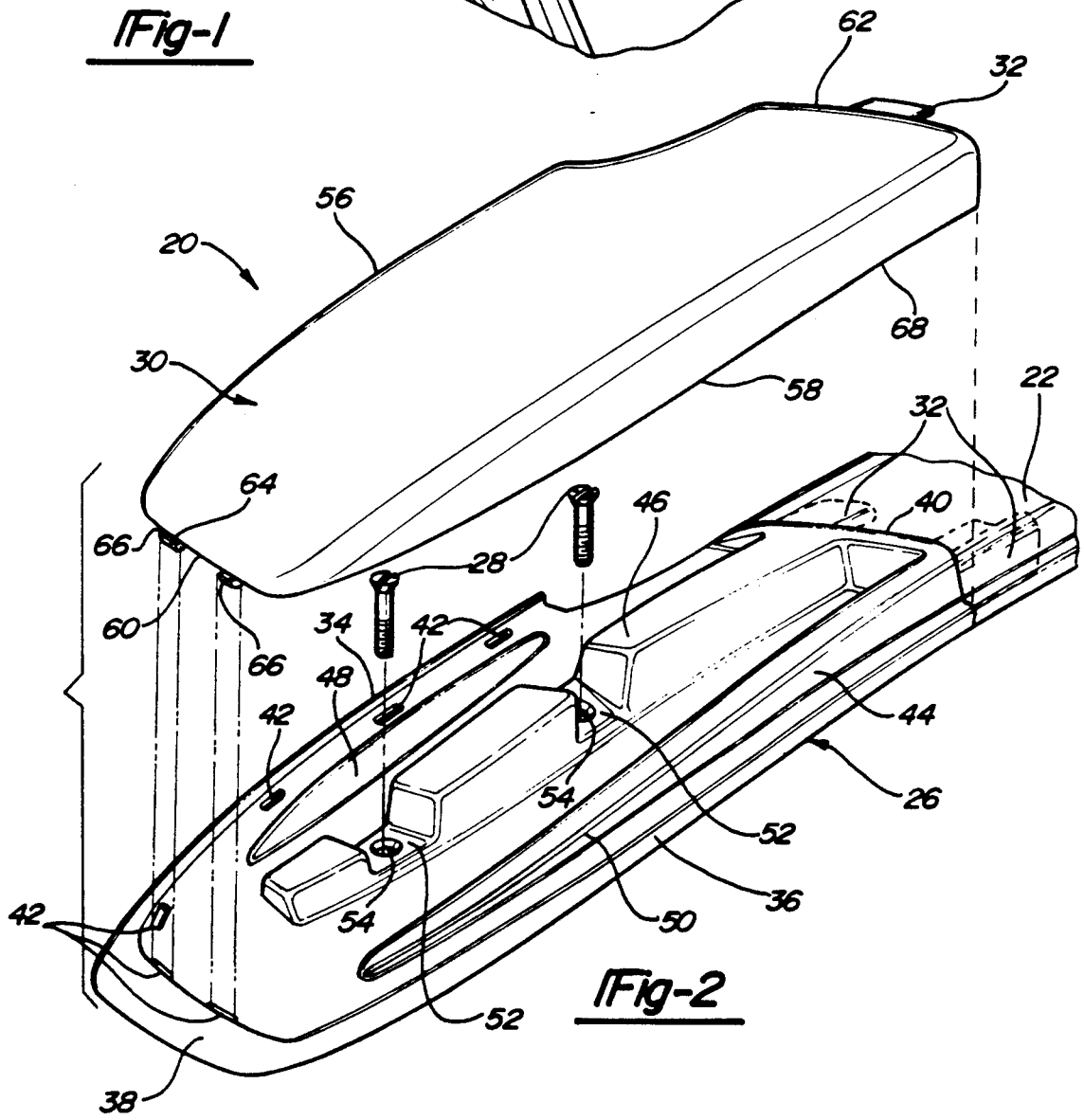
_Fig-2_

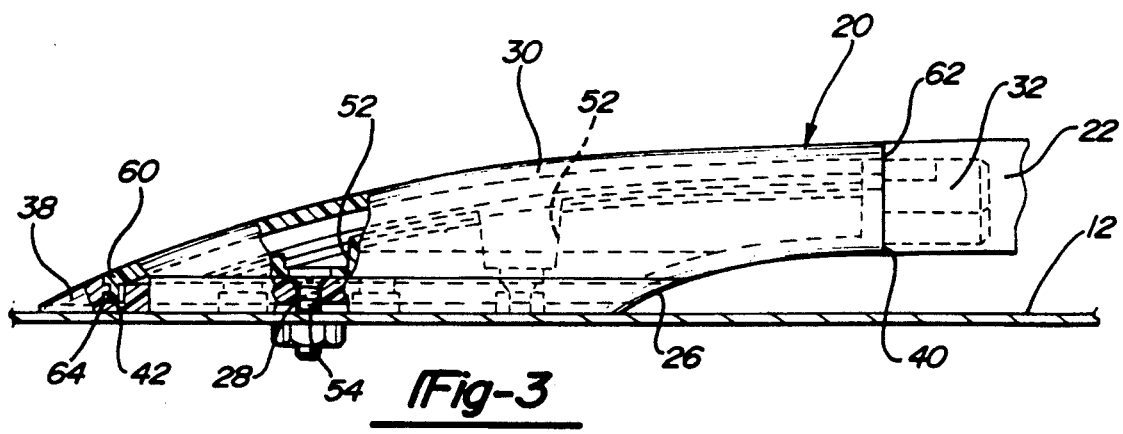
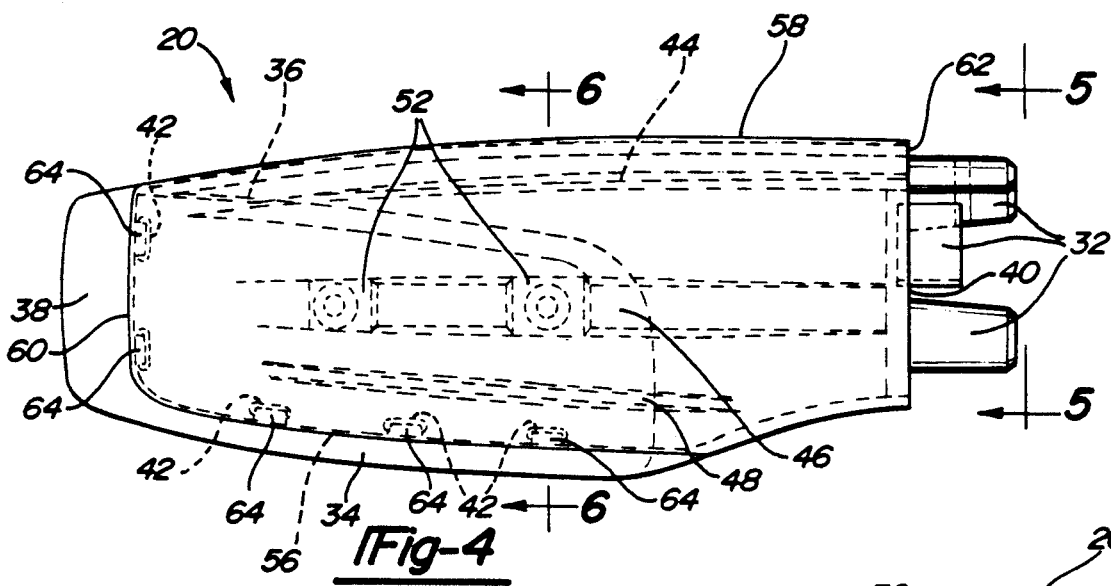
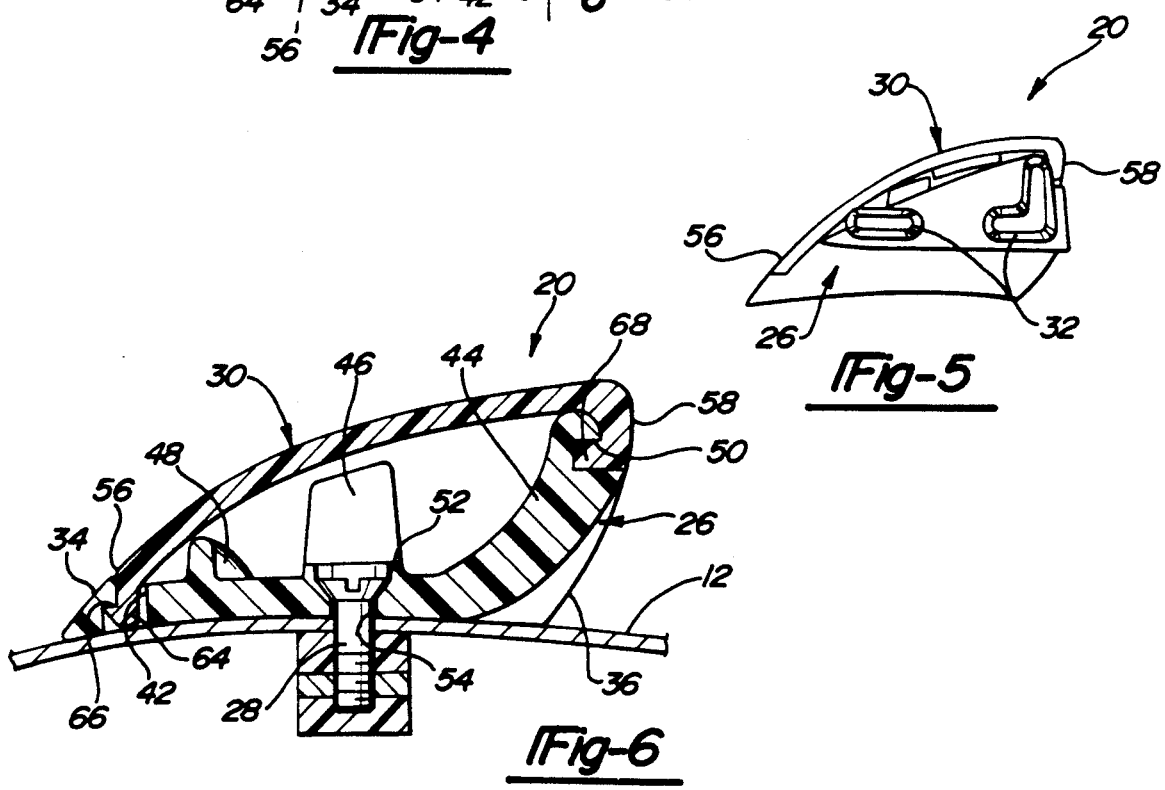

SUPPORT STANCHION FOR LUGGAGE CARRIER

This is a continuation of copending application(s) Ser. No. 07/362,643 filed on June 7, 1989 now abandoned.

BACKGROUND OF THE INVENTION

I. Field of the Invention

This invention relates to luggage carriers used on vehicles and, in particular, to a support stanchion for the carrier having a sleek, aerodynamic configuration formed by a snap-on cap which encloses the fastening means and forms the upper surface of the support.

II. Description of the Prior Art

Typical article carriers mounted to a deck or roof surface of a vehicle include a plurality of support stanchions to support the side and end rails in spaced apart relation above the vehicle surface. The support stanchions are secured to the vehicle surface using a plurality of fasteners fed through the stanchion body. Thus, the fasteners are exposed to the elements while the throughbore subtracts from the aesthetics as well as the aerodynamics of the carrier. Since aesthetics and aerodynamics have become increasingly important considerations in vehicle design, a high profile accessory such as a luggage carrier should not detract from these considerations.

Attempts have been made to protect the fasteners used to secure the stanchions by forming access doors or covers as part of the walls of the stanchion. However, such constructions sacrifice manufacturing considerations particularly when plastic molded components are used. Additionally, such access panels can become dislodged or lost.

SUMMARY OF THE PRESENT INVENTION

The present invention overcomes the disadvantages of the prior known luggage carriers by providing corner support stanchions which support end and side rails above the vehicle surface and are secured to the surface by fasteners hidden from view.

The article carrier of the present invention is preferably a conventional style carrier having four corner stanchions supporting a frame in spaced apart relation above the vehicle surface. The frame may include side rails extending between stanchions and end rails slidably adjustable along the side rails. Each of the support stanchions has a sleek aerodynamic appearance and consists of a rigid plastic support base to which are attached the side rails and a pliable plastic support cover which snaps over the base. Fasteners are used to initially secure the base to the vehicle surface and the cover fits over substantially the entire base member. As a result, a sleek stanchion appearance is provided.

The base includes a series of apertures along at least one edge thereof for receiving corresponding snap tabs formed in the cover. A raised ridge in the base has an elongated groove adapted to receive a corresponding lip of the cover. Once the tabs are positioned within the apertures, the inner lip of the pliable cover may be snapped over the ridge to seat within the groove and secure the cover.

Other objects, features, and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which:

FIG. 1 is an elevated perspective of a vehicle with the luggage carrier embodying the present invention mounted thereto;

FIG. 2 is an exploded perspective of a support stanchion of the present invention;

FIG. 3 is a side plan view of the support stanchion mounted to the vehicle surface;

FIG. 4 is a top plan view of the support stanchion of the present invention;

FIG. 5 is an end plan view of the support stanchion; and

FIG. 6 is a cross-sectional view of the support stanchion taken along lines 6—6 of FIG. 4.

DETAILED DESCRIPTION OF A PREFERRED EMBODIMENT OF THE PRESENT INVENTION

Referring first to FIG. 1, there is shown a vehicle luggage carrier 10 embodying the present invention. The carrier 10 is mounted to a surface 12 of a vehicle 14 and generally includes a peripheral frame 16 to retain the load and a plurality of slats 18 upon which the load is situated. Although the carrier 10 is shown mounted to the roof of the vehicle 14 it could be mounted to any substantially horizontal surface to facilitate the transport of luggage and similar articles. In the embodiment shown, the frame 16 has a substantially rectangular configuration and is secured to the surface 12 by four support stanchions 20 embodying the present invention. The stanchions 20 support the frame 16 in spaced apart relation to the vehicle surface 12 which may include a pair of side rails 22 fixedly extending between stanchions 20 and cross rails 24. The cross rails 24 may fixedly or movably attach to the side rails 22. The support stanchions 20 are fastened to the vehicle surface 12 yet the aerodynamic and aesthetic properties are enhanced by concealing the means utilized to fasten the stanchion 20.

Referring now to FIGS. 2 through 6, the stanchion construction of the present invention generally comprises a base member 26 mounted directly to the vehicle surface 12 by fasteners 28 and a cover 30 detachably secured to the base 26. The cover 30 provides the overall appearance of the stanchion 20 while concealing the internal configuration of the base 26 and the fasteners 28. In a preferred embodiment, both the base 26 and cover 30 include tongues 32 extending from one end of the stanchion 20 to be matingly received within the rail 22 for securement thereto.

The base member 26 has a generally elongated configuration with a peripheral edge including first side edge 34, second side edge 36, first end edge 38 and second end edge 40 from which the tongues 32 extend. Formed in the base 26 along at least one peripheral edge are a plurality of spaced apart slots 42. In a preferred embodiment, the slots 42 are spaced along the first side edge 34 and the first end edge 38 of the base 26. The base 26 also includes at least one, but preferably three, raised ridges extending substantially the length of the base 26. A first raised ridge 44 is formed along at least one peripheral edge, preferably the second side edge 36 of the base 26. A central raised ridge 46 is formed down the middle of the base 26 and a third ridge 48 is formed along first side edge 34 inwardly of the slots 42. The raised ridges provide support for the cover 30 which will sit on top of the ridges when attached to the base 26.

The first peripheral ridge 44 includes an elongated groove extending substantially the length of the ridge 44. The central ridge 46 includes indentations 52 within which are formed apertures 54 to receive the fasteners 28. The third ridge 48 has a height less than the height of the other ridges to accommodate the tapered configuration of the cover 30.

The cover 30 also has a generally elongated configuration to match the configuration of the base member 26. In a preferred embodiment, the cover 30 is made of a flexible plastic material such that the cover 30 is pliable enough to fit over the base 26. Similar to the base member 26, the cover 30 has first side edge 56, second side edge 58, first end edge 60, and second end edge 62 from which the tongue 32 extends. The cover 30 includes a plurality of locking tabs 64 formed along at least one, preferably the first side 56 and end 60, peripheral edges of the cover 30. The number of tabs 64 corresponds to the number of slots 42 in the base 26 and the tabs 64 extend downwardly from the cover 30 for mating engagement with the slots 42 as will be subsequently described. Each of the tabs 64 include a shoulder 66 to deter withdrawal of the tab 64 from the slot 42. The chambered configuration of the tab 64 facilitates locking insertion of the tab 64 into the slot 42.

Formed along at least one different edge of the cover 30 is a lip 68 adapted to be received within the groove 50 of the base 26. In a preferred embodiment, the lip 68 is formed along second side edge 58 and extends inwardly from the edge 58. The lip 68 extends substantially the length of the edge 58 in order to secure the edge to the base 26.

To attach the cover 30 to the base member 26 once the base 26 has been secured to the vehicle surface 12 using the fasteners 28, the cover 30 is placed over the base 26 such that tabs 64 align with corresponding slots 42. Because of the pliable nature of the cover 30, the cover 30 may be simply pressed down to insert tabs 64 into slots 42 and to drive lip 68 over the ridge 44 into groove 50. Alternatively, the tabs 64 may first be placed within the slots 42 after which the lip 68 may be pried over the ridge 44 and into groove 50. As a result, the fasteners 28 are concealed and the stanchion 20 is provided with a sleek integral appearance.

The foregoing detailed description has been given for clearness of understanding only and no unnecessary limitations should be understood therefrom as some modifications will be obvious to those skilled in the art without departing from the scope and spirit of the appended claims.

I claim:

1. A support stanchion for a vehicle luggage carrier adapted to be secured to a surface of the vehicle, said stanchion comprising:
a base member secured to the vehicle surface using at least one fastener extending therethrough, said base member including at least one slot formed along at least a first peripheral edge of said base and a raised ridge along at least a second peripheral edge of said base, said ridge having an elongated groove extending longitudinally along an outwardly disposed surface of said ridge; and a cover detachably secured to said base member forming said stanchion body while concealing said at least one fastener, said cover including locking tab means engageable with said at least one slot of said base and elongated lip formed along a side edge of said cover on an inwardly disposed surface thereof lockingly received within said elongated groove of said base to detachably secure said cover to said base permitting selective access to said at least one fastener, said cover extending over said ridge such that said ridge supports said cover.

2. The stanchion as defined in claim 1 wherein said at least one slot includes a plurality of spaced apart slots along said first peripheral edge and said tab means comprising a plurality of spaced apart locking tabs corresponding to said slots, said locking tabs received within said slots and said lip received within said groove to detachably secure said cover to said base.

3. The stanchion as defined in claim 2 wherein said base member has a central raised ridge extending substantially the length of said base, said central ridge and said peripheral ridge engageable with said cover to provide support of said cover.

4. The stanchion as defined in claim 3 wherein said central ridge includes at least one removed portion having an aperture to receive said at least one fastener.

5. The stanchion as defined in claim 3 wherein said base member includes a third raised ridge extending substantially parallel to said central ridge and engageable with said cover to provide support thereof.

6. The stanchion as defined in claim 5 wherein said base member is formed of a rigid plastic material and said cover is formed of a flexible plastic material such that said cover may be pliably fitted over said base member, said cover forming the configuration of said stanchion.

7. A support stanchion for a vehicle luggage carrier adapted to be secured to a surface of the vehicle to support at least one rail above the vehicle surface, said stanchion comprising:
a base member secured to the vehicle surface using fastening means extending therethrough, said base member including a plurality of apertures formed along at least a first side edge and an end edge and a raised ridge formed along at least a second side edge of said base, said ridge having an elongated groove formed along an outwardly disposed surface of said ridge below the top edge of said ridge; and a cover detachably secured to said base member forming said stanchion body while concealing said fastening means, said cover including a plurality of locking tabs formed along at least a first side edge and end edge corresponding to said plurality of apertures of said base member and an elongated lip formed along at least a second side edge on an inwardly disposed surface of said cover;

said locking tabs being received within corresponding apertures and said lip of said cover being received within said groove such that said cover extends over said ridge for support of said cover to detachably secure said cover to said base thereby forming said support stanchion.

8. The stanchion as defined in claim 7 wherein said plurality of apertures comprises slots formed along a first side edge and an end edge of said base and said raised ridge is formed along a second side edge of said base.

9. The stanchion as defined in claim 8 wherein said plurality of locking tabs are formed along a first side edge and an end edge of said cover and said lip is formed on an inner surface along a second side edge of said cover whereby said tabs are positioned within corresponding slots and said lip is passed over said ridge to seat within said groove to secure said cover to said base.

10. The stanchion as defined in claim 7 wherein said base member includes three substantially parallel raised ridges to provide support for said cover.

11. The stanchion as defined in claim 7 wherein said base member and said cover include tongues adapted to be matingly received within a rail of the carrier, said stanchion maintaining the rail of the carrier in spaced apart relation to the vehicle surface.

12. A support stanchion for a vehicle luggage carrier adapted to be secured to a surface of the vehicle to support at least one rail above the vehicle surface, said stanchion comprising:
- a base member secured to the vehicle surface using fastening means extending through said base member, said base member including a plurality of slots formed along a first side edge and an end edge thereof and a raised ridge formed along a second side edge thereof, said raised ridge having an elongated groove formed therein; and
- a cover detachably secured to said base member forming said stanchion body while concealing said fastening means, said cover including a plurality of locking tabs formed along a first side edge and an end edge of said cover and an elongated lip formed along a second side edge of said cover;
- said locking tabs being received within said slots of said base member and said lip of said cover being lockingly received within said groove of said base member to detachably secure said cover to said base thereby forming said support stanchion.

13. The stanchion as defined in claim 12 wherein said base member includes three substantially parallel raised ridges to provide support for said covers.

14. The stanchion as defined in claim 12 wherein said base member and said cover include at least one tongue adapted to be matingly received within the end of a rail of the carrier, the rail being supported in spaced apart relation to the vehicle surface.

15. The stanchion as defined in claim 12 wherein said base member is formed of a rigid plastic material and said cover is formed of a flexible plastic material such that said cover may be pliably attached to said base member.

16. In a vehicle luggage carrier adapted to be secured to a surface of the vehicle, the carrier including at least one rail supported in spaced apart relation to the vehicle surface by a support stanchion, said stanchion comprising:
- a base member secured to the vehicle surface by fastening means extending through said base member, said base member including a plurality of apertures formed along a first side edge and an end edge of said base and a raised ridge formed along at least a portion of a second side of said base; and
- a cover detachably secured to said base member forming said stanchion body while concealing said fastening means, said cover including a plurality of locking tabs formed along a first side edge and an end edge of said cover and a locking lip formed along at least a portion of a second side edge of said cover;
- said raised ridge of said base including an elongated groove for receiving said locking lip of said cover and said locking tabs received within corresponding apertures of said base member to detachably secure said cover to said base member.

17. A vehicle luggage carrier mountable to a surface of the vehicle, said luggage carrier comprising:
- a plurality of support stanchions mounted to the vehicle surface, said stanchions including a base member secured to the vehicle surface by fastening means extending through said base member, said base member having a plurality of apertures formed along a first side edge and an end edge of said base and a raised ridge formed along a second side edge of said base and a cover detachably secured to said base member forming said stanchion body while concealing said fastening means, said cover having a plurality of locking tabs formed along a first side edge and an end edge and locking lip means formed along at least a portion of a second side edge of said cover, said raised ridge of said base including means for receiving said lip means of said cover to detachably secure said cover to said base member; and
- a rail extending between pairs of support stanchions, said rail secured to a tongue formed by said cover and base member of said stanchion, said tongue matingly received within an end of said rial of said carrier, said rail being supported in spaced apart relation to the vehicle surface.

* * * * *